United States Patent
Hu et al.

(10) Patent No.: US 8,750,301 B2
(45) Date of Patent: Jun. 10, 2014

(54) METHOD, DEVICE FOR IMPLEMENTING IDENTIFIER AND LOCATOR SPLIT, AND METHOD FOR DATA ENCAPSULATING

(75) Inventors: Fangwei Hu, Shenzhen (CN); Zhongyu Gu, Shenzhen (CN); Lizhong Jin, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 158 days.

(21) Appl. No.: 13/579,806

(22) PCT Filed: Feb. 10, 2011

(86) PCT No.: PCT/CN2011/070919
§ 371 (c)(1),
(2), (4) Date: Aug. 17, 2012

(87) PCT Pub. No.: WO2011/103781
PCT Pub. Date: Sep. 1, 2011

(65) Prior Publication Data
US 2012/0314714 A1 Dec. 13, 2012

(30) Foreign Application Priority Data
Feb. 26, 2010 (CN) .......................... 2010 1 0135165

(51) Int. Cl.
*H04L 12/28* (2006.01)
*H04L 12/56* (2006.01)
*H04J 3/24* (2006.01)

(52) U.S. Cl.
USPC ............ 370/390; 370/392; 370/401; 370/474

(58) Field of Classification Search
CPC ......... H04L 45/00; H04L 45/02; H04L 45/04;
H04L 45/10; H04L 45/16; H04L 45/22;
H04L 45/28; H04L 45/48; H04L 45/50;
H04L 45/60; H04L 45/64; H04L 45/74;
H04L 45/302; H04L 45/507; H04L 12/18;
H04L 12/46; H04L 12/66; H04L 12/185;
H04L 12/2859; H04L 12/2874; H04L
12/4633; H04L 12/4641; H04L 1/22; H04L
29/0653; H04L 29/06095; H04L 47/825;
H04L 49/25; H04L 49/00; H04L 49/201;
H04L 49/309; H04L 49/3009; H04L 61/2015;
H04L 69/22; H04L 69/40; H04L 76/022;
H04L 2012/46; H04L 2012/5618; H04L
2012/5652; H04W 40/36; H04W 80/04
USPC ................ 370/229–240, 310–350, 389–393,
370/395.2–395.7, 400–409, 474–476;
455/403–414.4, 445–466
See application file for complete search history.

(56) References Cited

U.S. PATENT DOCUMENTS

| | | | | |
|---|---|---|---|---|
| 7,710,970 | B2 * | 5/2010 | Tingle et al. | 370/392 |
| 7,899,061 | B2 * | 3/2011 | Wu | 370/395.5 |
| 8,005,096 | B2 * | 8/2011 | Hardy et al. | 370/400 |
| 8,310,957 | B1 * | 11/2012 | Rekhter | 370/256 |
| 8,325,706 | B2 * | 12/2012 | Pacella | 370/351 |
| 8,599,849 | B2 * | 12/2013 | Aggarwal et al. | 370/390 |
| 8,605,723 | B2 * | 12/2013 | Aggarwal et al. | 370/390 |
| 2007/0076732 | A1 * | 4/2007 | Kim | 370/409 |

FOREIGN PATENT DOCUMENTS

| | | | | |
|---|---|---|---|---|
| CN | 1507230 A | | 6/2004 | |
| EP | 2528298 A2 * | | 11/2012 | H04L 29/06 |

OTHER PUBLICATIONS

Xu, Rui et. al. Survey of Naming and Addressing Architecture Based on Locator/Identifier Split, Journal of Computer Research and Development Dec. 31, 2009 p. 1777-1786, ISSN 1000-1239.

Daniel Migault et. al. Description of a Naming Architecture Managing Cryptographic Identifiers, 7th IEEE International Workshop on IP Operations and Management (IPOM 2007), Dec. 31, 2007, p. 13-24, ISSN 0302-9743.

Nakjung Choi, et. al. ID/LOC separation network architecture for mobility support in future internet, Advanced Communication Technology, 2009 11th International Conference, Dec. 31, 2009, p. 78-82, ISBN 978-89-5519-138-7.

International Search Report for PCT/CN2011/070919 dated Apr. 25, 2011.

* cited by examiner

*Primary Examiner* — Tri H Phan
(74) *Attorney, Agent, or Firm* — Ling Wu; Stephen Yang; Ling and Yang Intellectual Property

(57) ABSTRACT

A method for implementing Identity and Locator Split is provided. The method is applied in a MPLS network. ITR and ETR are also LERs in the MPLS network. The method includes: establishing a point to point LSP tunnel between ITR and ETR by running a MPLS signaling protocol; the ITR storing an EID of endpoint and RLOC mapping as well as a RLOC and outer MPLS label mapping, and forwarding the endpoint's data packets in the MPLS network based on the outer MPLS label corresponding to the RLOC. A data encapsulation method for Identity and Locator Split and a LER device in the Identity and Locator Split network are also provided in the present invention. The present invention greatly improves the encapsulation and transmission efficiency of LISP data packets in the MPLS network.

18 Claims, 4 Drawing Sheets

|  | 0 | 7 | 8 | 10 | 11 | 15 | 16 | 24 |
|---|---|---|---|---|---|---|---|---|
| | 31 | | | | | | | |

OH
- Version number | Traffic class | Traffic label
- Valid payload length | Next packet header=17 | Restriction on the number of hops
- Source routing locator
- Destination routing locator UDP
- Source port | Destination port=4341
- UDP length | UDP check sum LISP
- Routing locator reachable
- S | E | Reserved flag | Random number (Nonce)

IH
- Version number | Traffic class | Traffic label
- Valid payload length | Next packet header | Restriction on the number of hops
- Source host identity
- Destination host identity

FIG. 2

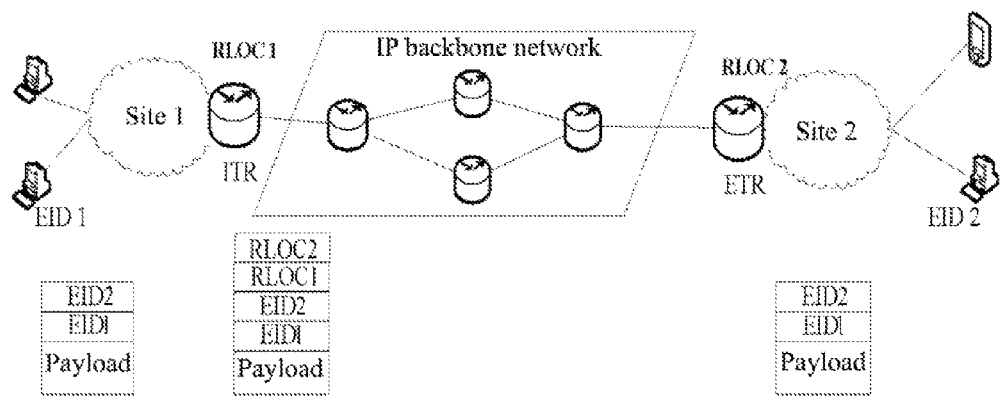

FIG. 3

METHOD, DEVICE FOR IMPLEMENTING IDENTIFIER AND LOCATOR SPLIT, AND METHOD FOR DATA ENCAPSULATING

TECHNICAL FIELD

The present invention relates to the field of communication technologies, and more especially, to a method and device for implementing Identity and Locator Split and a method for data encapsulation.

BACKGROUND OF THE RELATED ART

The continuous increase in Internet users as well as the development of new network technologies, such as multi-homing technology, traffic engineering, policy routing, and virtual private network (VPN) technology and so on, result in an increase in the scale of the router's routing table, especially, the dramatic increase of the Border Gateway Protocol (BGP) routing table in the Default-Free Zone (DFZ), and the issue of scalability of the routing table scale is increasingly becoming the bottleneck in the current network development.

This issue was first raised by the Internet Architecture Board (IAB) in the routing and address technology seminar in the Internet Engineering Task Force (IETF) meeting in October 2006, thereafter, for the problem that the scale of the DFZ routing table is too large, a number of solutions are put forward, and most of these solutions are based on one common idea: the Locator/ID Split, that is, splitting the dual property of the identity and routing locator of IP address, using the Endpoint Identity (EID) to identify one host device and using the Routing Locator (RLOC) for route addressing and forwarding data packet.

The Locator ID Separation Protocol (LISP) is a network-based locator and identity separation protocol, and its basic idea is:

(1) the existing IP address is divided into the endpoint identity (EID) and the routing locator (RLOC), and the concept of the Tunnel Routers is introduced, and the tunnel routers includes the Ingress tunnel Router (ITR) and the Egress Tunnel Router (ETR);

(2) the host does not change, and the IP address of the data sent by host is represented by the EID, and the transport of said data packet in the network depends on the RLOC information, and the packet is forwarded by looking up the RLOC routing table;

(3) the ITR is responsible for data packet encapsulation and searching for mapping, that is, searching out the corresponding RLOC information according to the destination EID information in the data packet, and encapsulating the searched-out RLOC information in the data packet header;

(4) the ETR is responsible for de-capsulating and then forwarding the data packet to the destination host when receiving a data packet.

The LISP data encapsulation and forwarding use an IP-in-IP method, and the source IP address and destination IP address of outer IP packet header are RLOC addresses and are used to forward the data packet in the network, and the source IP address and the destination IP address of the inner layer IP packet header are the endpoint identities (EIDs), the data packet encapsulation formats are respectively shown in FIGS. 1 and 2, wherein, FIG. 1 is the IP-in-IP encapsulation format of an IPv4 packet and FIG. 2 is the IP-in-IP encapsulation format of an IPv6 packet.

FIG. 3 shows the data forwarding method in the existing LISP network. After the ITR receives an IP packet from the host, according to the destination EID address in the packet, the ITR searches for the corresponding RLOC address in the local mapping cache, and under normal circumstances, the ITR's local cache saves the EID and RLOC mapping, and if the EID and RLOC mapping is not searched out in the ITR local cache, it needs to query the mapping system and save the mapping in the local mapping cache. The ITR encapsulates the IP packet header outside the host IP packet, and encapsulates the searched-out RLOC address as the destination IP address of the outer IP packet. During the transmission process in the IP backbone network, the forwarding of data packets only depends on the outer destination RLOC address for looking up the routing table, and after the data packet reaches the ETR, the ETR peels off the outer IP packet header and forwards the inner IP packet to the destination host.

The deployment of the LISP technology in the existing IP network needs to form an edge of a tunnel router, and it needs to upgrade the protocol stack of the routers on the edge to form an ITR/ETR, so as to implement the IP-in-IP data encapsulation and packet forwarding of the LISP, and other routers are not affected. Of course, the ITR/ETR can be newly deployed to implement the LISP. Since the Multiprotocol Label Switching (MPLS) technology has basically been deployed in the current mainstream IP networks in order to achieve the VPN service, traffic engineering, and Quality of Service (QoS) and other functions, and the label switched path (LSP) is used to achieve fast forwarding. Therefore, it is considered to use the label switching technology function in the MPLS network to achieve the fast forwarding of the packet and utilize the advantages of MPLS in aspects of VPN services, traffic engineering and QoS and so on during the deployment of LISP technology.

Currently, there is no corresponding solution to be put forward in the prior art to solve the problems about how to effectively deploy the LISP technology in the MPLS network and how to implement the encapsulation and forwarding of packets.

SUMMARY OF THE INVENTION

To solve the technical problem, the present invention is to provide a method and device for implementing identity and locator split as well as a data encapsulation method to implement the LISP deployment in the existing MPLS network and to encapsulate and forward data packets in the MPLS network.

In order to solve the aforementioned problem, the present invention provides a method for implementing identity and locator split, and said method is used in a multi-protocol label switching (MPLS) network, and an Ingress Tunnel Router (ITR) and an Egress tunnel router (ETR) are also label edge routers (LERs) in the MPLS network, and said method comprises:

establishing a point-to-point label switched path (LSP) tunnel between the ITR and ETR by running a MPLS signaling protocol, the ITR saving an endpoint identity (EID) of endpoint and routing locator (RLOC) mapping and a RLOC and outer MPLS label mapping, and forwarding data packets of the endpoint in said MPLS network based on the outer MPLS label corresponding to the RLOC.

The step of forwarding data packets of the endpoint in said MPLS network based on the outer MPLS label corresponding to the RLOC comprises:

when the ITR receives a data packet sent by the endpoint, searching for a corresponding RLOC according to EID of a destination endpoint in the data packet, and searching out a corresponding outer MPLS label according to the RLOC;

the ITR performing two-layer label encapsulation on the data packet, firstly encapsulating an inner MPLS label outside the data packet, wherein the inner MPLS label is used to indicate that the data packet is a locator ID Separation Protocol (LISP) data packet, and then encapsulating the searched-out outer MPLS label outside, sending the data packet to said MPLS network, and forwarding it through the outer MPLS label to the ETR which a destination host attaches.

Said method further comprises:

said inner MPLS label is distributed by extending a multi-protocol border gateway protocol (MP-BGP), and the ETR distributes different inner MPLS labels to a plurality of ITRs respectively.

Said method further comprises:

said ETR storing said inner MPLS label and RLOC mapping;

after the ETR receives the data packet, searching out the corresponding RLOC according to the inner MPLS label encapsulated in the data packet.

Said LISP data packet comprises: an inner IP packet header, and a source IP address and a destination IP address of the inner IP packet header are EID addresses; said LISP data packet further comprises a LISP header, or further comprises a User Datagram Protocol (UDP) header and a LISP header.

Said MPLS signaling protocol comprises: Label Distribution Protocol (LDP) or Resource Reservation Protocol (RSVP).

In order to solve the aforementioned problem, the present invention also provides a data encapsulation method for Identity and Locator Split, and said method is used in a Multi-Protocol Label Switching (MPLS) network and said method comprises:

ITR performing two-layer label encapsulation on a data packet, firstly encapsulating an inner MPLS label outside the data packet, wherein the inner MPLS label is used to indicate that the data packet is a locator ID Separation Protocol (LISP) data packet, and then encapsulating an outer MPLS label, wherein the outer MPLS label is used to forward the data packet through the outer MPLS label to ETR which a destination host attaches.

The ITR saves an endpoint identity (EID) of endpoint and routing locator (RLOC) mapping as well as a RLOC and outer MPLS label mapping;

the step of encapsulating an outer MPLS label comprises: when the ITR receives a data packet sent by the endpoint, according to EID of a destination endpoint in the data packet, searching for a corresponding RLOC, and searching for a corresponding outer MPLS label according to the RLOC, after completing encapsulation of the inner MPLS label, encapsulating the searched-out outer MPLS label outside.

Said inner MPLS labels are distributed by extending a multi-protocol border gateway protocol (MP-BGP), and the ETR respectively distributes different inner MPLS labels to a plurality of ITRs.

Said LISP data packet comprises: an inner IP header, and a source IP address and a destination IP address of the inner IP packet header are the EID addresses; said LISP data packet further comprises a LISP header, or further comprises a UDP header and a LISP header.

To solve the aforementioned problem, the present invention also provides a label edge router (LER) device in an Identity and Locator Split network, and said LER device is used in a Multi-Protocol Label Switching (MPLS) network, and the LER device is an ingress tunnel router (ITR) or an egress tunnel router (ETR); wherein, when said LER device is the ITR, said ITR is configured to: establish a point-to-point label switched path (LSP) tunnel with the ETR by running a MPLS signaling protocol, save an endpoint identity (EID) and routing locator (RLOC) mapping as well as a RLOC and outer MPLS label mapping, and after completing encapsulation of a data packet sent by an endpoint, send the data packet to a MPLS network;

when said LER device is the ETR, said ETR is configured to: establish a point-to-point LSP tunnel with the ITR by running the MPLS signaling protocol, as well as when receiving a data packet sent to a destination endpoint, after completing de-capsulation of the data packet, forward the data packet to the destination endpoint.

When said LER device is the ITR, said ITR is configured to send the data packet to the MPLS network after encapsulating the data packet sent by the endpoint as follows: searching for a corresponding RLOC according to EID of the destination endpoint in said data packet, and then searching for a corresponding outer MPLS label according to said RLOC, encapsulating an inner MPLS label outside the data packet, wherein said inner MPLS label is used to indicate that the data packet is a locator ID separation Protocol (LISP) data packet, then encapsulating the searched-out outer MPLS label outside;

when said LER device is the ETR, said ETR is configured to: perform label de-capsulation on the data packet sent to the destination endpoint, and then forward the data packet to the destination endpoint.

When said LER device is the ETR, said ETR is further configured to: distribute different inner MPLS labels to a plurality of ITRs respectively, wherein, the inner MPLS labels are generated by extending a multi-protocol border gateway protocol (MP-BGP); and save an inner MPLS label and RLOC mapping, after receiving the data packet, search out the corresponding RLOC according to the inner MPLS label encapsulated in the data packet.

When said LER device is the ITR, said ITR is further configured to: when the RLOC corresponding to EID of the destination endpoint cannot be searched out locally, initiate a request message to an overlay having an interface to said ITR, wherein the mapping request message comprises the EID of the destination endpoint; and when receiving a reply message returned by said overlay, store the EID of the destination endpoint and RLOC mapping locally;

when said LER device is the ETR, said ETR is further configured to: after a new EID is searched out, initiate an EID registration request including said new EID and the corresponding RLOC to said overlay;

wherein, based on the received EID registration request initiated by the ETR, the overlay completes establishment and maintenance of a control plane EID-RLOC mapping; and the overlay provides a query function to the ITR, and after receiving a request message containing the EID, according to the established and maintained EID-RLOC mapping, the corresponding RLOC is searched out, and the reply message which includes the RLOC corresponding to said EID is returned.

Compared with the prior art, the present invention at least has the following beneficial effects:

the present invention implements the deployment of LISP in an existing MPLS network, and implements the data forwarding of Identity and Locator Split technology based on the label switching protocol tunnel, so as to solve the problem of low encapsulation and transmission efficiency of the data packet;

an optimized data encapsulation method is also provided so that IP-in-IP encapsulation is not performed on the data packets any more, while the MPLS label encapsulation method is directly used, the packet encapsulating and forwarding mechanism in the existing MPLS network can be used to greatly improve the encapsulation and transmission efficiency of the LISP data packets in the MPLS network.

BRIEF DESCRIPTION OF DRAWINGS

FIG. 2 is an IPv6 packet encapsulation format of IP-in-IP of LISP;

FIG. 3 is a flow chart of forwarding a LISP data packet in the related art;

PREFERRED EMBODIMENTS OF THE PRESENT INVENTION

If directly deploying the LISP in the existing MPLS network, the packet encapsulating and forwarding method needs to perform the MPLS label encapsulation, packet encapsulation after the IP-in-IP encapsulation of the packet, thus the encapsulation and transmission efficiency of packets is low. Therefore, the present invention provides a MPLS label based data encapsulation method, in which the IP-in-IP encapsulation is not performed on the data packets any more, while the MPLS label encapsulation method is directly used, and the packet encapsulating and forwarding mechanism in the existing MPLS network can be used to greatly improve the encapsulation and transmission efficiency of the LISP data packets in the MPLS network. At the same time, this technology can be used to perform the deployment of LISP technology in the MPLS network, and it can provide an end-to-end MPLS network deployment from the ITR to the ETR, which facilitates using the MPLS technology to implement the network traffic engineering, the VPN, the QoS, and other features.

In the following, the embodiments of the present invention will be described in detail with combination of the accompanying drawings. It should be noted that in the case of no conflict, the embodiments in this application and the characteristics of the embodiments can be randomly combined with each other.

When deploying the LISP in the existing MPLS network, the following content is mainly involved:

(1) the LISP data packet is the two-layer MPLS label encapsulated rather than the IP-in-IP IP packet header encapsulated: the inner label is used to indicate that the data packet is a LISP data packet, and the outer label is used to forward the data packet in the MPLS network.

Wherein, the purpose of setting the inner label is that, when the ETR receives a LISP data packet encapsulated with MPLS label, after peeling off the outer label, the data packet is identified as a LISP data packet depending on the value of the inner label, and if there is no inner label, when the ETR peels off the outer label, the ETR device is not able to identify the inner LISP header.

Figure 1:
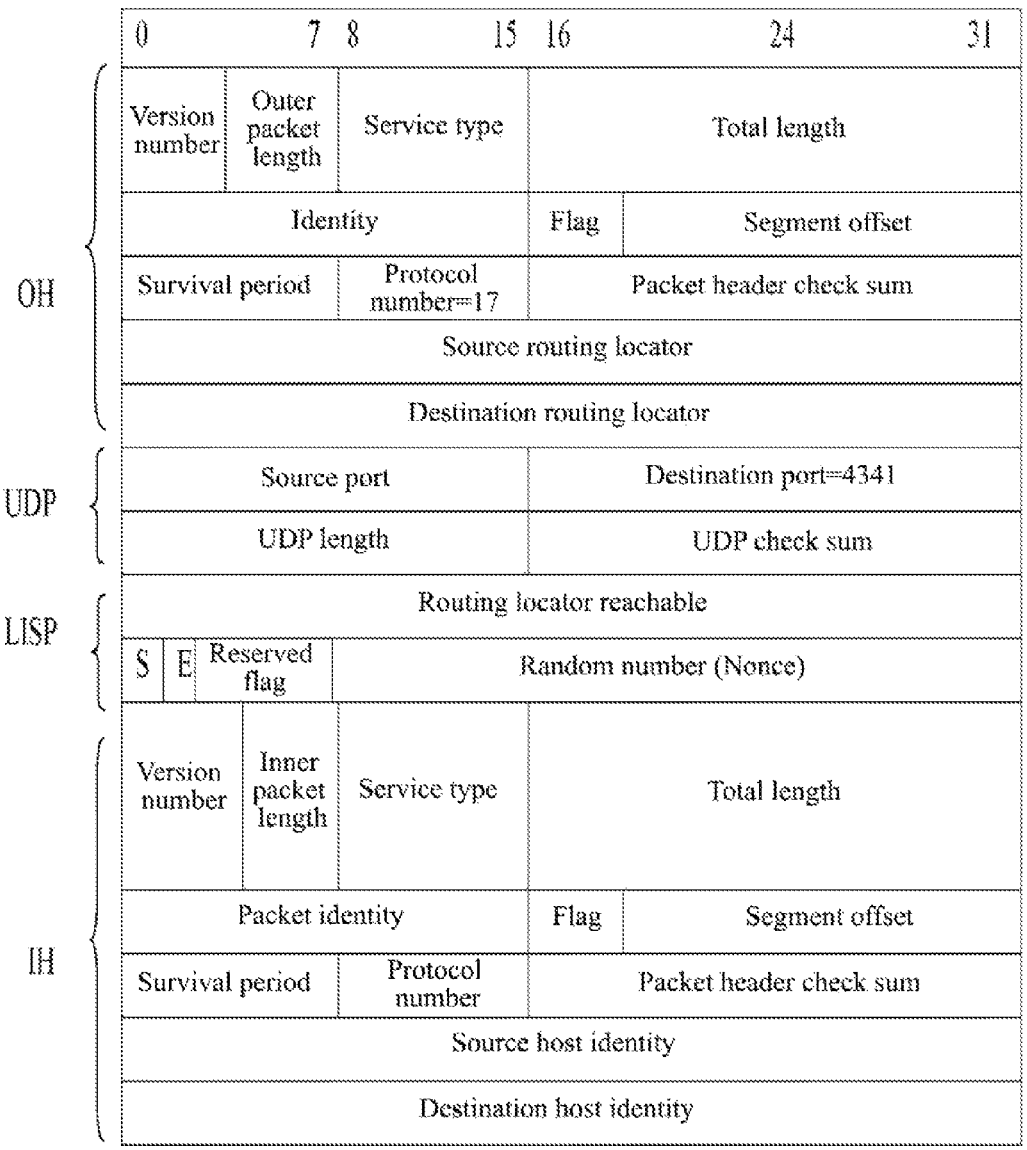
FIG. 1 is an IPv4 packet encapsulation format of IP-in-IP of LISP.
Figure 4:
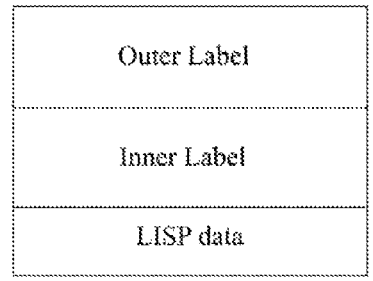
FIG. 4 is a schematic diagram of label switching protocol tunnel based data packet encapsulation format in accordance with an embodiment of the present invention.

As shown in FIG. 4, in the embodiment of the present invention, the encapsulation format of the data packet removes the outer IP packet header (OH) in the IP-in-IP encapsulation, and two layers of MPLS label headers are added: the Outer Label and the Inner Label, wherein, the inner label can be distributed by extending the multi-protocol Border Gateway Protocol (MP-BGP), and MP-BGP neighbors are established between the ETR and the ITR, and the ETR can distribute inner labels to a plurality of ITRs, and for different ITRs, the distributed inner labels are also different. When the ETR and ITR peers enable the LISP function, the inner labels are distributed. The inner labels also play the role of indicating the corresponding RLOC information, and the ETR stores the inner MPLS label and RLOC mapping; and after the ETR receives a data packet, it searches out the corresponding RLOC according to the inner label encapsulated in the data packet.

According to differences of specific applications, the aforementioned LISP data packet can comprise a user datagram protocol (UDP) Header, a LISP header and an inner IP packet header, wherein, the source IP address and the destination IP address of the inner IP packet header are the EID addresses; or it may not comprise the UDP header; or it may comprise neither the UDP header nor the LISP header.

(2) the ITR in the LISP protocol is also the Label Edge Router (LER) of the MPLS, therefore, the ITR not only maintains the EID-RLOC mapping, it also needs to maintain the RLOC and outer label mapping, through the EID address of the endpoint, the corresponding outer forwarding label can be finally searched;

(3) the ETR is also the LER of the MPLS, it establishes a point-to-point label switched path tunnel (LSP Tunnel) with the ITR, which is used for forwarding the LISP data; the ETR is also responsible for saving the inner label and RLOC mapping.

Figure 5:
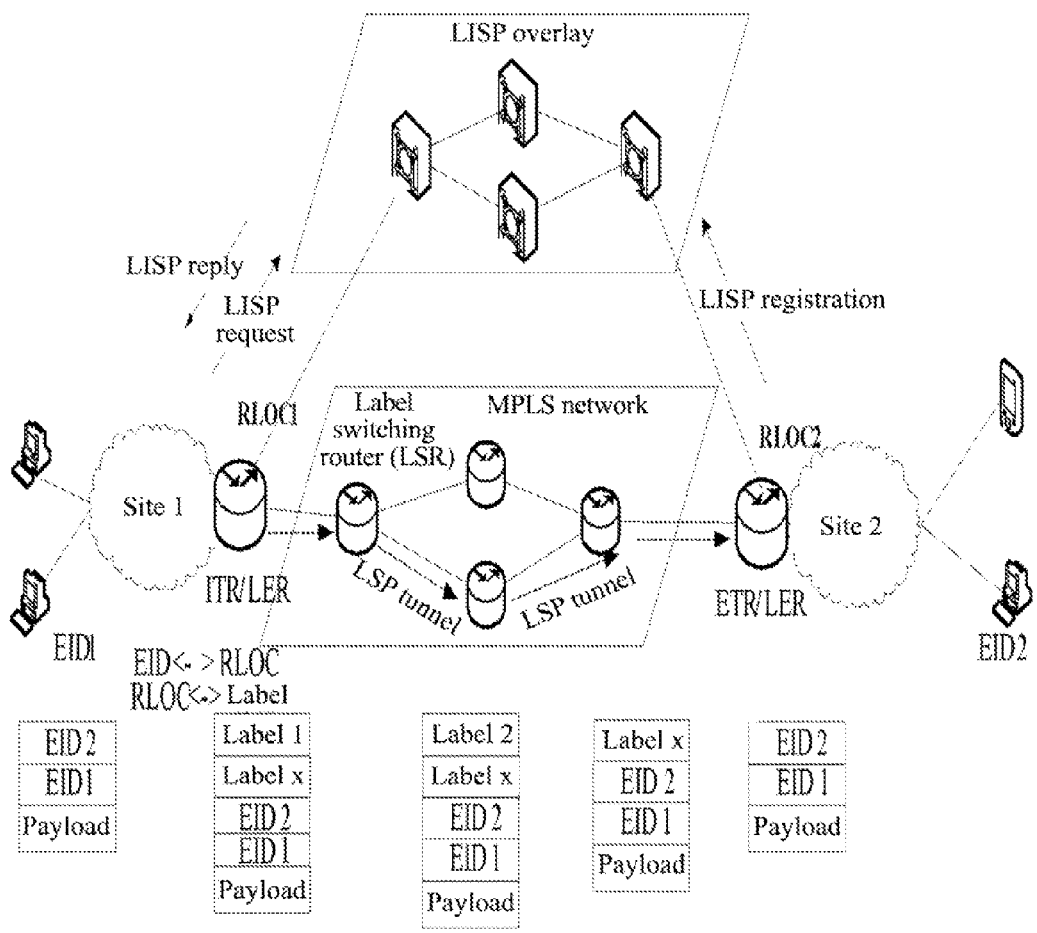
FIG. 5 is a structure diagram of label switching protocol tunnel based Identity and Locator Split network in accordance with an embodiment of the present invention.

The label switching protocol tunnel based identity and locator split network structure provided in the embodiment of the present invention is shown in FIG. 5, and the overlay structure is still used, the LISP overlay is responsible for accepting the registration of the ETR, and completing the establishment and maintenance of the control plane EID-RLOC mapping, as well as providing a query function to the ITR. For example, when the ETR has a new host EID, it sends an EID registration message including said new EID and the corresponding RLOC to the overlay, and the overlay establishes the host's EID-RLOC mapping. Forwarding data depends on the MPLS network, and by running the signaling protocol, such as label distribution protocol (LDP), Resource Reservation Protocol (RSVP) and other protocol, a point-to-point LSP tunnel from the ITR to the ETR is established. The ITR stores the EID and RLOC mapping, and also stores the RLOC and outer label mapping. The two-layer MPLS format encapsulation of the data packet is completed on the ITR, and when the data packet is transmitted in the MPLS network, the de-capsulation and route lookup of the IP packet header are not required, only the outer label (such as Label1, Label2) switching is required. The ETR can find the corresponding RLOC address according to the inner label Labelx.

The RLOC and outer label mapping has been saved in the ITR device when the LSP tunnel is established, the egress label corresponding to the RLOC can be searched out by querying the label forwarding table.

To achieve the aforementioned purpose, the method for implementing the Identity and Locator Split based on the existing MPLS network in accordance with an embodiment of the present invention specifically comprises:

an Ingress Tunnel Router (ITR) and an Egress Tunnel Router (ETR) establish a point-to-point label switched path (LSP) tunnel by running the MPLS signaling protocol, the ITR stores the EID and routing locator (RLOC) mapping of the endpoint as well as the RLOC and outer MPLS label mapping and forwards the data packet of the endpoint in the MPLS network according to the outer MPLS label corresponding to the RLOC.

Said ITR and ETR are also the LER devices in the MPLS network.

When the ITR receives a data packet sent by the endpoint, it searches for the corresponding RLOC according to EID of the destination endpoint in said data packet, and searches for the corresponding outer MPLS label according to the RLOC, firstly, an inner MPLS label is encapsulated to indicate that the data packet is a LISP data packet, then the searched-out outer MPLS label is encapsulated outside the data packet, and then the data packet is sent to the MPLS network, and the data packet is forwarded through the outer MPLS label to the ETR which said destination host attaches.

Said MPLS signaling protocol comprises LDP, RSVP and so on.

Furthermore, the present invention also provides the aforementioned data encapsulation method.

Figure 6:
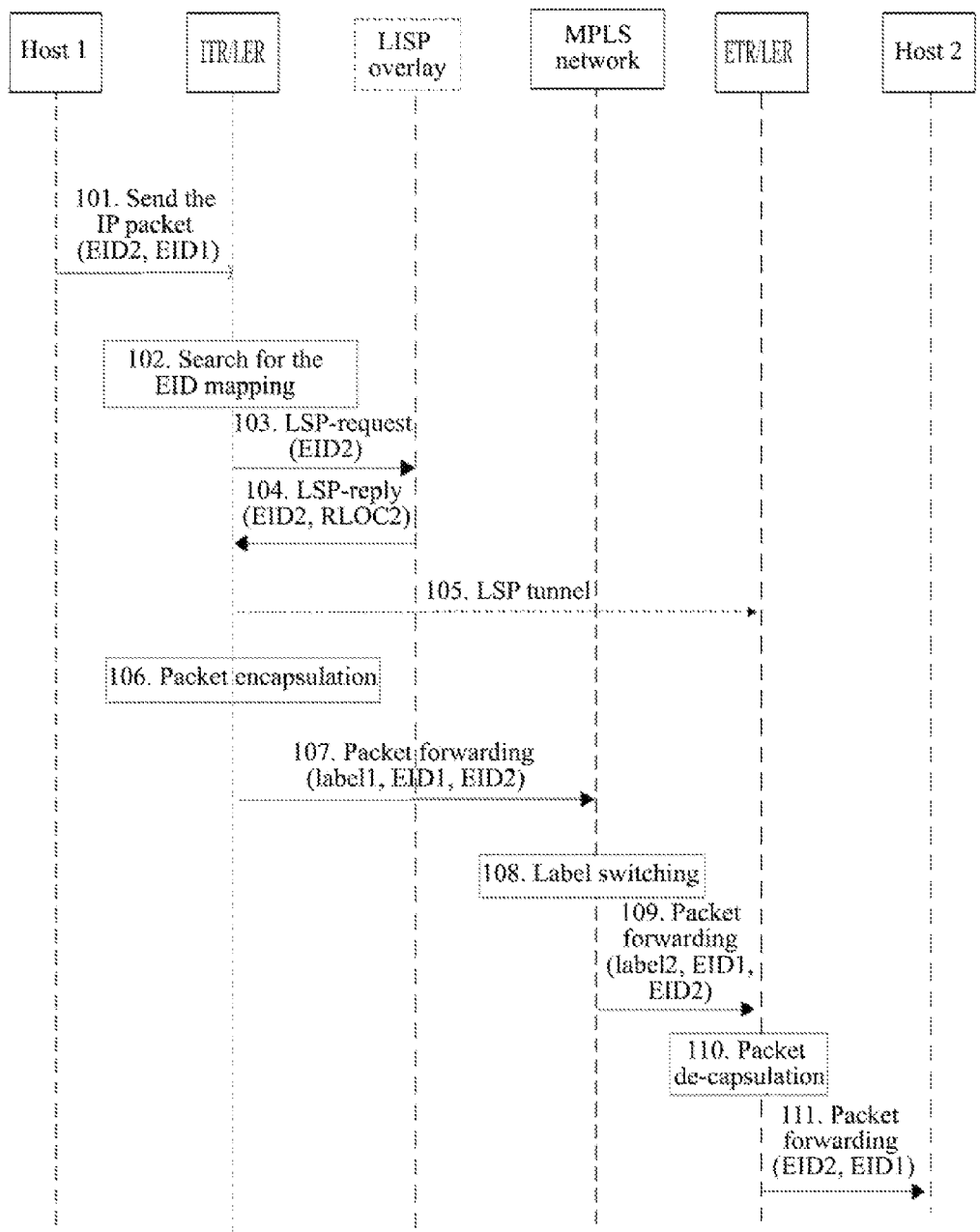
FIG. 6 is a flow chart of data forwarding of Identity and Locator Split technology based on the label switching protocol tunnel in accordance with an embodiment of the present invention.

In the following, the data forwarding process of the Identity and Locator Split based on the label switching protocol tunnel in the present invention will be further explained with combination of examples, as shown in FIG. 6, the data forwarding process in this example is described as follows:

step 101, the Host 1 initiates a communication with the Host2 and sends the IP packet, and the packet can be an IPv4 or IPv6 packet and so on, and the IP packet's destination IP address is the Host2's EID address, and the source IP address is the Host1's EID address;

step 102, after the ITR receives the IP packet, it searches for the RLOC corresponding to the EID2 in the local cache, and if the corresponding RLOC address is searched out, it indicates that the packet is not the initial packet, continuing to search for the egress label corresponding to the RLOC address, and if the egress label is searched out, directly proceed to step 106; if the egress label cannot be searched out, directly proceed to step 105; if the RLOC address corresponding to the EID is not searched out, it indicates that the user packet is the initial packet, proceed to step 103;

step 103, the ITR encapsulates a LISP-Request packet and sends the packet to the LISP Overlap to request the RLOC address of the EID2, wherein the LISP-Request packet comprises the EID2;

step 104, after the LISP Overlap receives the LISP-Request packet, it searches for the RLOC information corresponding to the EID and encapsulates the LISP-Reply packet, wherein the LISP-Reply packet includes the RLOC address information;

step 105, after the ITR receives the LISP-Reply packet, it stores the EID2 and RLOC mapping in the local cache and initiates the establishment of a point-to-point LSP tunnel from the ITR to the ETR;

in this step, the process of establishing the point-to-point LSP tunnel is the process of implementing the RLOC and outer Label mapping in each routing device that needs to perform the forwarding. When the RLOC address of the host changes, the corresponding outer MPLS label is also re-distributed, and it can be implemented with the existing technology that its corresponding outer MPLS label is re-distributed when the IP address in the existing MPLS network changes, and the process will not be repeated here.

The point-to-point LSP tunnel from the ITR to the ETR may be pre-established due to the topology-driven, and in this case, the tunnel can be used directly.

step 106, the ITR encapsulates the LISP data packet and performs the packet encapsulation in the MPLS packet format, adding two layers of MPLS labels outside the IP packet header, wherein the inner MPLS label is used to indicate the LISP data packet and the outer MPLS label is used to forward the data packet in the MPLS network. The destination IP address of the inner IP packet header is the EID2 address and the source IP address is the EID1 address;

step 107, the ITR forwards the encapsulated LISP data packet to the MPLS network;

step 108, Label Switching is performed on the LISP data packet is in the MPLS network and the LISP data packet is forwarded based on the outer MPLS label;

wherein, the routing table does not need to be looked up during the transmission process of the data packet.

Step 109, the LISP data packet reaches to the ETR;

step 110, the ETR de-capsulates the received data packet, and the former hop function of MPLS is not forbidden in the present invention, therefore, the outer label has been stripped in the former hop device of the ETR, and the ETR just peels off the encapsulated inner label and retains the inner IP packet header;

step 111, the IP packet is routed according to the destination EID and forwarded to the destination host Host2.

In addition, the embodiment of the present invention also provides a system for implementing Identity and Locator Split to be used in a multi-protocol label switching (MPLS) network, and the system mainly comprises:

ITR, configured to: establish a point-to-point LSP tunnel with ETR by running a MPLS signaling protocol, and save an EID and RLOC mapping of endpoint as well as a RLOC and outer MPLS label mapping, and after completing encapsulation of a data packet sent by an endpoint, send the data packet to a MPLS network;

ETR, configured to: establish a point-to-point LSP tunnel with the ITR by running the MPLS signaling protocol, as well as when receiving a data packet sent to a destination endpoint, after completing de-capsulation of the data packet, forward the data packet to the destination endpoint.

Furthermore, said ITR is configured to send the data packet to the MPLS network after encapsulating the data packet sent by the endpoint as follows: searching for a corresponding RLOC according to EID of the destination endpoint in said data packet, and then searching for a corresponding outer MPLS label according to said RLOC, encapsulating an inner MPLS label outside the data packet, wherein said inner MPLS label is used to indicate that the data packet is a LISP data packet, then encapsulating the searched-out outer MPLS label outside;

said ETR is configured to: perform label de-capsulation on the data packet sent to the destination endpoint, and then forward the data packet to the destination endpoint.

Furthermore, said ETR is further configured to: distribute different inner MPLS labels to a plurality of ITRs respectively, wherein, the inner MPLS labels are generated by extending a multi-protocol border gateway protocol (MP-BGP); and save an inner MPLS label and RLOC mapping, after receiving the data packet, search out the corresponding RLOC according to the inner MPLS label encapsulated in the data packet.

Furthermore, said system also comprises an overlay, and said ITR and said ETR have interfaces to the overlay, wherein, said ITR is further configured to: when the RLOC corresponding to EID of the destination endpoint cannot be searched out locally, initiate a request message to the overlay, wherein the mapping request message comprises the EID of the destination endpoint; and when receiving a reply message returned by said overlay, store the EID of the destination endpoint and RLOC mapping locally;

said ETR is further configured to: after a new EID is searched out, initiate an EID registration request including said new EID and the corresponding RLOC to said overlay;

the overlay is configured to: based on the received EID registration request initiated by the ETR, complete establishment and maintenance of a control plane EID-RLOC mapping; and provide a query function to the ITR, after receiving a request message containing the EID, according to the established and maintained EID-RLOC mapping, search out the corresponding RLOC and return the reply message which includes the RLOC corresponding to said EID.

Said ITR and ETR are also the LER devices in the MPLS network.

This embodiment also provides a label edge router (LER) device in an Identity and Locator Split network, and said LER device is used in a Multi-Protocol Label Switching (MPLS) network, and the LER device is an ingress tunnel router (ITR) or an egress tunnel router (ETR); wherein, when said LER device is the ITR, said ITR is configured to: establish a point-to-point label switched path (LSP) tunnel with ETR by running a MPLS signaling protocol, save an endpoint identity (EID) and routing locator (RLOC) mapping as well as a RLOC and outer MPLS label mapping, and after completing encapsulation of a data packet sent by an endpoint, send the data packet to a MPLS network;

when said LER device is the ETR, said ETR is configured to: establish a point-to-point LSP tunnel with ITR by running the MPLS signaling protocol, as well as when receiving a data packet sent to a destination endpoint, after completing de-capsulation of the data packet, forward the data packet to the destination endpoint.

When said LER device is the ITR, said ITR is configured to send the data packet to the MPLS network after encapsulating the data packet sent by the endpoint as follows: searching for a corresponding RLOC according to EID of the destination endpoint in said data packet, and then searching for a corresponding outer MPLS label according to said RLOC, encapsulating an inner MPLS label outside the data packet, wherein said inner MPLS label is used to indicate that the data packet is a locator ID separation Protocol (LISP) data packet, then encapsulating the searched-out outer MPLS label outside;

when said LER device is the ETR, said ETR is configured to: perform label de-capsulation on the data packet sent to the destination endpoint, and then forward the data packet to the destination endpoint.

When said LER device is the ETR, said ETR is further configured to: distribute different inner MPLS labels to a plurality of ITRs respectively, wherein, the inner MPLS labels are generated by extending a multi-protocol border gateway protocol (MP-BGP); and save an inner MPLS label and RLOC mapping, after receiving the data packet, search out the corresponding RLOC according to the inner MPLS label encapsulated in the data packet.

When said LER device is the ITR, said ITR is further configured to: when the RLOC corresponding to EID of the destination endpoint cannot be searched out locally, initiate a request message to an overlay having an interface to said ITR, wherein the mapping request message comprises the EID of the destination endpoint; and when receiving a reply message returned by said overlay, store the EID of the destination endpoint and RLOC mapping locally;

when said LER device is the ETR, said ETR is further configured to: after a new EID is searched out, initiate an EID registration request including said new EID and the corresponding RLOC to said overlay;

wherein, based on the received EID registration request initiated by the ETR, the overlay completes establishment and maintenance of a control plane EID-RLOC mapping; and the overlay provides a query function to the ITR, after receiving a request message containing the EID, according to the established and maintained EID-RLOC mapping, the corresponding RLOC is searched out, and the reply message which includes the RLOC corresponding to said EID is returned.

The ordinary person skilled in the art can understand that all or part of the steps in the aforementioned method can be completed through the program instructing the related hardware, and said program can be stored in a computer readable storage medium, such as read-only memory, magnetic disk, or CD-ROM and so on. Optionally, all or part of the steps in the above embodiments can also be implemented with one or more integrated circuits. Accordingly, each modular unit in the aforementioned embodiments can be implemented in the form of hardware or software functional modules. The present invention is not limited to any particular form of hardware and software combination.

The above description is only preferred embodiments of the present invention and is not intended to limit the present invention, and the present invention can have a variety of changes and modifications for ordinary person skilled in the field. Any changes, equivalent replacements and improvements and so on without departing from the spirit and principles of the present invention should be included within the protection scope of the present invention.

INDUSTRIAL APPLICABILITY

The present invention implements the deployment of LISP in an existing MPLS network, and implements the data forwarding the Identity and Locator Split technology based on the label switching protocol tunnel, so as to solve the problem of low encapsulation and transmission efficiency of the data packet; an optimized data encapsulation method is also provided in the present invention, so that the IP-in-IP encapsulation is not performed on the data packets any more, and the MPLS label encapsulation method is directly used, the packet encapsulating and forwarding mechanism in the existing MPLS network can be used to greatly improve the encapsulation and transmission efficiency of the LISP data packets in the MPLS network.

What is claimed is:

1. A method for implementing identity and locator split, used in a multi-protocol label switching (MPLS) network, an Ingress Tunnel Router (ITR) and an Egress tunnel router (ETR) also being label edge routers (LERs) in the MPLS network, said method comprising:

establishing a point-to-point label switched path (LSP) tunnel between the ITR and the ETR by running a MPLS signaling protocol, the ITR saving an endpoint identity (EID) of endpoint and routing locator (RLOC) mapping and a RLOC and outer MPLS label mapping, and forwarding data packets of the endpoint in said MPLS network based on the outer MPLS label corresponding to the RLOC.

2. The method of claim 1, wherein the step of forwarding data packets of the endpoint in said MPLS network based on the outer MPLS label corresponding to the RLOC comprises:

when the ITR receives a data packet sent by the endpoint, searching for a corresponding RLOC according to EID of a destination endpoint in the data packet, and searching out a corresponding outer MPLS label according to the RLOC;

the ITR performing two-layer label encapsulation on the data packet, firstly encapsulating an inner MPLS label outside the data packet, wherein the inner MPLS label is for indicating that the data packet is a locator ID Separation Protocol (LISP) data packet, and then encapsulating the searched-out outer MPLS label outside, sending the data packet to said MPLS network, and forwarding the data packet through the outer MPLS label to the ETR which a destination host attaches.

3. The method of claim 2, further comprising:

said inner MPLS label being distributed by extending a multi-protocol border gateway protocol (MP-BGP), and the ETR distributing different inner MPLS labels to a plurality of ITRs respectively.

4. The method of claim 3, further comprising:

said ETR storing an inner MPLS label and RLOC mapping;

after the ETR receives the data packet, searching out the corresponding RLOC according to the inner MPLS label encapsulated in the data packet.

5. The method of claim 2, wherein, said LISP data packet comprises: an inner IP packet header, and a source IP address and a destination IP address of the inner IP packet header are EID addresses; said LISP data packet further comprises a LISP header, or further comprises a User Datagram Protocol (UDP) header and the LISP header.

6. The method of claim 1, wherein, said MPLS signaling protocol comprises: Label Distribution Protocol (LDP) or Resource Reservation Protocol (RSVP).

7. A data encapsulation method for Identity and Locator Split, used in a Multi-Protocol Label Switching (MPLS) network, said method comprising:

ITR performing two-layer label encapsulation on a data packet, firstly encapsulating an inner MPLS label outside the data packet, wherein the inner MPLS label is for indicating that the data packet is a locator ID Separation Protocol (LISP) data packet, and then encapsulating an outer MPLS label, wherein the outer MPLS label is for forwarding the data packet through the outer MPLS label to ETR which a destination host attaches.

8. The method of claim 7, wherein, the ITR saves an endpoint identity (EID) of endpoint and routing locator (RLOC) mapping as well as a RLOC and outer MPLS label mapping;

the step of encapsulating an outer MPLS label comprises:

when the ITR receives a data packet sent by the endpoint, according to EID of a destination endpoint in the data packet, searching for a corresponding RLOC, and searching for a corresponding outer MPLS label according to the RLOC, after completing encapsulation of the inner MPLS label, encapsulating the searched-out outer MPLS label outside.

9. The method of claim 8, wherein, said inner MPLS labels are distributed by extending a multi-protocol border gateway protocol (MP-BGP), and the ETR respectively distributes different inner MPLS labels to a plurality of ITRs.

10. The method of claim 8, wherein, said LISP data packet comprises: an inner IP header, and a source IP address and a destination IP address of the inner IP packet header are EID addresses; said LISP data packet further comprises a LISP header, or further comprises a UDP header and the LISP header.

11. The method of claim 7, wherein, said inner MPLS labels are distributed by extending a multi-protocol border gateway protocol (MP-BGP), and the ETR respectively distributes different inner MPLS labels to a plurality of ITRs.

12. The method of claim 7, wherein, said LISP data packet comprises: an inner IP header, and a source IP address and a destination IP address of the inner IP packet header are EID addresses; said LISP data packet further comprises a LISP header, or further comprises a UDP header and the LISP header.

13. A label edge router (LER) device in an Identity and Locator Split network, used in a Multi-Protocol Label Switching (MPLS) network, the LER device being an ingress tunnel router (ITR) or an egress tunnel router (ETR); wherein, when said LER device is the ITR, said ITR is configured to: establish a point-to-point label switched path (LSP) tunnel with the ETR by running a MPLS signaling protocol, save an endpoint identity (EID) and routing locator (RLOC) mapping as well as a RLOC and outer MPLS label mapping, and after completing encapsulation of a data packet sent by an endpoint, send the data packet to the MPLS network;

when said LER device is the ETR, said ETR is configured to: establish the point-to-point LSP tunnel with the ITR by running the MPLS signaling protocol, as well as when receiving a data packet sent to a destination endpoint, after completing de-capsulation of the data packet, forward the data packet to the destination endpoint.

14. The LER device of claim 13, wherein, when said LER device is the ITR, said ITR is configured to send the data packet to the MPLS network after encapsulating the data packet sent by the endpoint as follows: searching for a corresponding RLOC according to EID of the destination endpoint in said data packet, and then searching for a corresponding outer MPLS label according to said RLOC, encapsulating an inner MPLS label outside the data packet, wherein said inner MPLS label is for indicating that the data packet is a locator ID separation Protocol (LISP) data packet, then encapsulating the searched-out outer MPLS label outside;

when said LER device is the ETR, said ETR is configured to: perform label de-capsulation on the data packet sent to the destination endpoint, and then forward the data packet to the destination endpoint.

15. The LER device of claim 14, wherein, when said LER device is the ETR, said ETR is further configured to: distribute different inner MPLS labels to a plurality of ITRs respectively, wherein the inner MPLS labels are generated by extending a multi-protocol border gateway protocol (MP-BGP); and save an inner MPLS label and RLOC mapping, after receiving the data packet, search out the corresponding RLOC according to the inner MPLS label encapsulated in the data packet.

16. The LER device of claim 14, wherein, when said LER device is the ITR, said ITR is further configured to: when the RLOC corresponding to EID of the destination endpoint cannot be searched out locally, initiate a request message to an overlay having an interface to said ITR, wherein the mapping request message comprises the EID of the destination endpoint; and when receiving a reply message returned by said overlay, store the EID of the destination endpoint and RLOC mapping locally;

when said LER device is the ETR, said ETR is further configured to: after a new EID is searched out, initiate an EID registration request including said new EID and corresponding RLOC to said overlay;

wherein, based on the received EID registration request initiated by the ETR, the overlay completes establishment and maintenance of a control plane EID-RLOC mapping; and the overlay provides a query function to the ITR, and after receiving a request message containing the EID, according to the established and maintained EID-RLOC mapping, the corresponding RLOC is searched out, and the reply message which includes the RLOC corresponding to said EID is returned.

17. The LER device of claim 15, wherein, when said LER device is the ITR, said ITR is further configured to: when the RLOC corresponding to EID of the destination endpoint cannot be searched out locally, initiate a request message to an overlay having an interface to said ITR, wherein the mapping request message comprises the EID of the destination endpoint; and when receiving a reply message returned by said overlay, store the EID of the destination endpoint and RLOC mapping locally;

when said LER device is the ETR, said ETR is further configured to: after a new EID is searched out, initiate an EID registration request including said new EID and corresponding RLOC to said overlay;

wherein, based on the received EID registration request initiated by the ETR, the overlay completes establishment and maintenance of a control plane EID-RLOC mapping; and the overlay provides a query function to the ITR, and after receiving a request message containing the EID, according to the established and maintained EID-RLOC mapping, the corresponding RLOC is searched out, and the reply message which includes the RLOC corresponding to said EID is returned.

18. The LER device of claim 13, wherein, when said LER device is the ITR, said ITR is further configured to: when the RLOC corresponding to EID of the destination endpoint cannot be searched out locally, initiate a request message to an overlay having an interface to said ITR, wherein the mapping request message comprises the EID of the destination endpoint; and when receiving a reply message returned by said overlay, store the EID of the destination endpoint and RLOC mapping locally;

when said LER device is the ETR, said ETR is further configured to: after a new EID is searched out, initiate an EID registration request including said new EID and corresponding RLOC to said overlay;

wherein, based on the received EID registration request initiated by the ETR, the overlay completes establishment and maintenance of a control plane EID-RLOC mapping; and the overlay provides a query function to the ITR, and after receiving a request message containing the EID, according to the established and maintained EID-RLOC mapping, the corresponding RLOC is searched out, and the reply message which includes the RLOC corresponding to said EID is returned.

* * * * *